US005487944A

United States Patent [19]

Ikkanzaka et al.

[11] Patent Number: 5,487,944

[45] Date of Patent: Jan. 30, 1996

[54] NON-WOVEN FABRIC SHEET SEPARATOR MATERIAL FOR STORAGE BATTERIES AND METHOD FOR MAKING THE SAME

[75] Inventors: Isao Ikkanzaka, Takarazuka; Kazuhiro Ikeda, Suita; Yousuke Takai, Hyogo, all of Japan

[73] Assignees: Kanai Juyo Kogyo Co., Ltd., Itami; Daiwabo Create Co., Ltd., Osaka, both of Japan

[21] Appl. No.: 320,393

[22] Filed: Oct. 11, 1994

Related U.S. Application Data

[62] Division of Ser. No. 937,950, Sep. 1, 1992, Pat. No. 5,354,617.

[30] Foreign Application Priority Data

Oct. 23, 1991 [JP] Japan .................................... 3-275154

[51] Int. Cl.[6] ........................................................ B05D 3/02

[52] U.S. Cl. .......................... 428/374; 428/373; 427/335; 427/402; 427/412.3; 427/444

[58] Field of Search ............................ 429/249; 264/557, 264/561, 562; 427/335, 402, 912.3, 444; 422/248.1; 428/373, 374

[56] References Cited

U.S. PATENT DOCUMENTS

| | | | |
|---|---|---|---|
| 3,998,871 | 12/1976 | Carlson | 523/568 |
| 4,110,143 | 8/1978 | Cogliano et al. | 156/167 |
| 4,384,032 | 5/1983 | Tashiro et al. | 429/249 |

FOREIGN PATENT DOCUMENTS

| | | |
|---|---|---|
| 0316916 | 5/1989 | European Pat. Off. . |
| 0395336 | 10/1990 | European Pat. Off. . |
| 04504494 | 10/1991 | European Pat. Off. . |
| 642510 | 10/1984 | Germany . |
| 57-141862 | 9/1982 | Japan . |
| 58-194254 | 11/1983 | Japan . |
| 2061812 | 10/1980 | United Kingdom . |

*Primary Examiner*—Patrick J. Ryan
*Assistant Examiner*—Richard Weisberger
*Attorney, Agent, or Firm*—Fish & Richardson

[57] ABSTRACT

The invention is to a non-woven fabric sheet for a storage battery separator. The sheet has an excellent property of holding electrolyte by using conjugate fibers having a specific sectional form. The sheet comprises an ethylene copolymer having a specific structure which can introduce a desirable amount of sulfo groups efficiently under mild reaction condtions. Conjugate fibers having a split sectional form include a first component and a second component having a radial arrangement. The conjugate fibers are obtained by forming an ethylene based random copolymer containing a unit represented by a formula $—CH_2CH(COOH)—$, with polypropylene. Subsequently, a non-woven fabric sheet of a thermally bonding type is obtained by mixing the conjugate fibers with polypropylene fibers. Subsequently, a non-woven fabric sheet for a storage battery separator is obtained by sulfonating the non-woven fabric sheet using gas such as $SO_3$ to form a unit of the formula $—CH_2C(SO_3H)(COOH)—$.

4 Claims, 4 Drawing Sheets

NON-WOVEN FABRIC SHEET SEPARATOR MATERIAL FOR STORAGE BATTERIES AND METHOD FOR MAKING THE SAME

This application is a division of U.S. application Ser. No. 07/937,950 filed Sep, 1, 1992, now U.S. Pat. No. 5,354,617.

FIELD OF THE PRESENT INVENTION

This invention relates to a non-woven fabric sheet for alkaline storage battery separators obtained by using conjugate fibers having a specific ethylene based copolymer and a method of manufacturing such battery separators.

BACKGROUND OF THE INVENTION

It is generally known that alkaline storage battery separators use a non-woven fabric sheet having a polyolefin based fiber. Various kinds of olefin based separators which have chemial resistant properties can undergo severe cell reaction when the temperature of the battery electrolyte is increased to about 80° C. In addition, polyolefin based fibers such as polypropylene fiber and polyethylene fiber which are alkali and oxidation resistant have fatal faults in that the polyolefin based fibers have poor affinity with battery electrolyte and are poor at holding the battery electrolyte.

In order to solve the above mentioned problems, polyolefin based non-woven fabric sheets which are treated with a surface active agent are disclosed in Japanese unexamined laid open patent applications (Tokkai-sho) No. 147956/1983, 194255/1983 and 39362/1986. A non-woven fabric sheet separator using vinylon is disclosed in Japanese patent applications (Tokko-sho) No. 26942/1981 and a non-woven fabric sheet separator using an ethylene-vinyl alcohol copolymer fiber is disclosed in Japanese unexamined laid open patent applications (Tokkai-sho) No. 4849/1983. A non-woven fabric sheet separator using a sulfonated polyethylene fiber or polypropylene is disclosed in Japanese unexamined laid open patent application (Tokkai-sho) No. 175256/1983, (Tokkai-hei) Nos. 57568/1989, and 132043/1989, and in U.S. Pat. No. 5,100,723 (EPC patent publication No. 316916A2/1989).

However, according to the above references, the hydrophilic property of a non-woven fabric sheet separator which is treated with a surface active agent was reduced by the elution or deterioration or decomposition of the surface active agent as a result of repeated charging and discharging for a long period. A non-woven fabric sheet separator using vinylon, or an ethylene-vinyl alcohol copolymer fiber had some problems in that the life of a storage battery was shortened due to deterioration and developed a short-circuit which was caused by extended polymer deterioration by an oxidation reaction which a strong alkaline battery electrolyte.

According to the sulfonated storage battery separators mentioned above, however, α-polyolefin was subjected to sulfonation with concentrated sulphuric acid at higher than 100° C. or with highly concentrated fuming sulphuric acid or the like. This means that hydrogen substitution in a tertiary carbon is involved. The efficiency of this reaction was inferior. In addition, the introduction of a desired amount of sulfo groups was difficult and the sulfonated storage battery separators above mentioned posed many problems in the process of manufacturing causing considerable damage of the fiber. Further, according to the above refference, the non-woven fabric sheet separator have high rigidity. Therefore, it is not good workability of the assembly storage battery operation.

SUMMARY OF THE INVENTION

The present invention is intended to solve many of the above problems. An ethylene copolymer having a specific structure which can introduce a desirable amount of sulfo groups efficiently was used under mild reaction condition. The invention provides storage battery separators using conjugate fibers having a specific sectional form and a method of manufacturing such battery separators. It is another object of the invention to provide a good workability of the assembly storage battery operation.

In order to meet the above objective, a non-woven fabric sheet separator for an storage battery separator is provided, comprising a first component of an ethylene based random copolymer having a unit represented by the formula —$CH_2C(SO_3(COOOH)$—, and a second component of a polyolefin having a melting point no higher than 250° C., wherein at least one of the first and second components has a sectional form divided into more than two parts, with each component having at least one exposed surface.

It is preferable in this invention that the non-woven fabric sheet comprises a mixture of 30% or more by weight of a conjugate fiber and a polyolefin fiber.

The conjugate fiber preferably has a sectional form of a swelling type (evagination) or a substantially polygon type. The conjugate fiber preferably has a mixing ratio of the first component and second component of 10:90 to 90:10, and has a exposure ratio of the first component and the second component of 95:5 to 50:50.

According to the invention, the first component of conjugate fiber preferably comprises ethylene based copolymer resin composed of 0.5 to 25% by weight of an ethylenecarbonic monomer preferably acrylic acid and/or maleic acid, 0 to 24.5% by weight of acrylic acid ester and 99.5 to 75% by weight of ethylene. Said second component preferably comprises a polyolefin having a melting point no higher than 250° C.

According to the invention, the second component fiber is preferably polypropylene.

According to the invention; the non-woven fabric sheet preferably comprises a mixture of 30% or more by weight of said conjugate fiber and the polyolefin fiber. The first component of the conjugate fibers is preferably a thermal bonding component.

The exposure ratio of the first component of the conjugate fiber to the surface of the fiber is preferably 95% to 50%. The conjugate fiber has an enhanced fiber forming property, bonding property, hydrophilic property, card machine web forming property, peel resistant property against mechanical stress, and good workability of the assembly storage battery operation. According to the invention, the first component has 0.4 to 4 mol % sulfo groups. Sulfo-group-added ethylenecarbonic acid that is contained in the first component of the conjugate fibers in the non-woven fabric sheet will not in itself produce a sufficiently hydrophilic fiber, if its content in the first component does not reach 0.4 mol %, and there will be gelation or dissolution of fibers in an alkaline liquid if the sulfo content in the first component exceeds 4 mol %.

According to the invention, the method of manufacturing storage battery separators comprises:

(A) forming a fiber web composed of 30% or more by weight of conjugate fibers by mixing the conjugate fiber of a thermally bonding type in which the fibers comprise a first component of an ethylene based random copolymer (the first component precursor) composed of 0.5 to 25% by weight of an ethylenecarbonic monomer (preferably 0.5 to 25% by weight acrylic acid and/or maleic acid) 0 to 24.5% by weight of acrylic acid ester and 99.5 to 75% by weight of ethylene said copolymer having a melting point $Tm_1$ ° C. of $70° C. < Tm_1 < 130° C.$, and a second component of a polyolefin having a melting point $Tm_2$ ° C. of $Tm_1+20° C. < Tm_2 250° C.$ In addition, either the first component or the second component of the conjugate fiber has a sectional form which is divided into more than two parts with each component having at least one exposed surface. In addition, the conjugate fiber preferably has a mixing ratio of the first component and the second component, 10:90 to 90:10, and an exposure ratio of 95:5 to 50:50:

(B) forming a non-woven fabric sheet by passing the fiber web through a heating furnace or at least a pair of flat thermal press rollers, thereby forming a non-woven fabric sheet through thermal bonding of the constituent fibers caused by melting the first component of conjugate fiber: and (C) sulfonating the non-woven fabric sheet, thereby introducing sulfo groups into tertiary carbon atom locations of the ethylene based random copolymer of the first component to which carboxylic groups have been bonded.

According to the invention, the second component of the conjugate fiber preferably has a sectional form of a swelling shape (evagination) or a substantially polygon shape.

It is preferable in this invention that the sulfo groups introducing is contacted a non-woven fabric sheet with $SO_3$ gas.

According to the invention, a non-woven fabric sheet separator for a storage battery is obtained by mixing more than 30 wt % of a thermal bonding type of fiber comprising at least two components and the surface of the conjugate fiber has many ethylene based copolymer units containing at least one unit represented by the formula —$CH_2CH(COOH)$—, the first component precursor having an excellent fiber bonding property. Thus a desirable bonding type of non-woven fabric sheet can be obtained by changing the mixing ratio of the conjugate fiber and the thermal treatment conditions. The first component precursor is the conjugate fiber copolymer comprising a unit having a carboxyl group. Thus, in comparison with other polyolefin based fibers as the second component, the first component precursor can introduce a desired amount of sulfo groups easily, and can impart a hydrophilic property to the surface of the fiber without deteriorating the fiber.

Further, at least one of the first and second components of the conjugate fiber has a split sectional form. The exposure ratio of the first component of the conjugate fiber to the surface of the fiber is preferably 95% to 50% which is sulfonated and its hydrophobic property are improved. Thus, the surface of the conjugate fiber is excellently in hydrophilic and only the surface area of the fiber can be enlarged without increasing the weight ratio of the first component, which is a beneficial property in making an extremely strong conjugate fiber. In addition, the problem concerning bonding between the fibers in the drawing process after the conjugate fiber in melt spinning can be resolved. Further, a problem concerning peeling of the fiber can be resolved as the bonding property of the first component and the second component of the conjugate fiber is extremely strong. In addition, since the battery separator according to the invention is soft to form a non-woven fabric sheet, it is good workability of the assembly storage battery operation.

DETAILED DESCRIPTION OF THE INVENTION

According to the invention, the sulfonation of a conjugate fiber is carried out steadily and easily by using a first component precursor of the conjugate fiber (e.g., an ethylene copolymer containing a unit represented by the formula —$CH_2$—$CH(COOH)$—) before sulfonation. In addition, various kinds of physical processing and separator properties of the fiber were improved by using the conjugate fiber in which at least one of the first and second components has a specific sectional form of split arrangement.

The ethylene-based random copolymer containing the unit represented as —$CH_2CH(COOH)$— is the first component precursor of the sulfonated conjugate fibers of the invention and has a melting point below about 130° C., while having a strong self-bonding property. Thus, the conjugate fiber is beneficial as a thermal bonding conjugate fiber. In addition, the conjugate fiber has an enhanced fiber forming property, bonding property, hydrophilic property, card machine web forming property, peel resistant property against mechanical stress, and good workability of the assembly storage battery operation.

Figure 1:
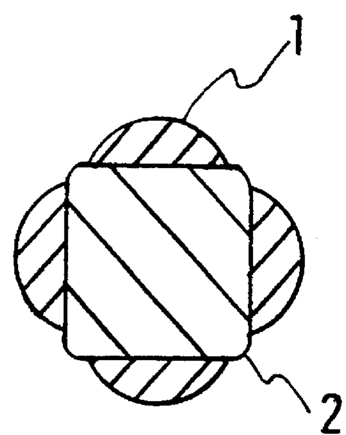
FIG. 1 shows a typical sectional form of the conjugate fiber which was used in the Example 1 of this invention.
Figure 2:
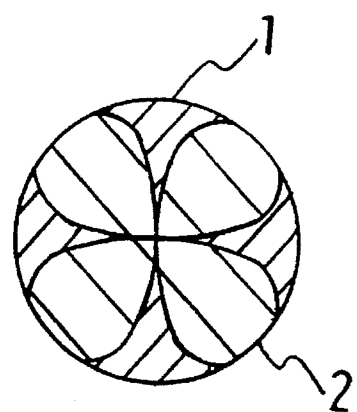
FIG. 2 shows a typical sectional form of the conjugate fiber which was used in the Example 2 of this invention.
Figure 3A:
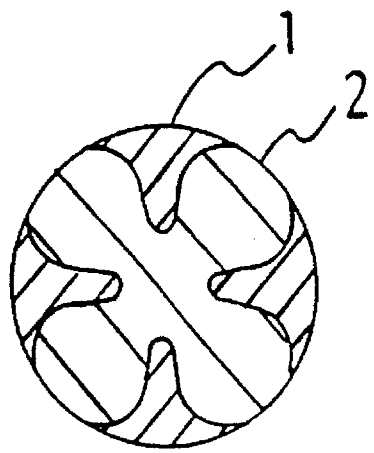
FIG. 3(*a*)–(*d*) show typical sectional forms of the other kinds of conjugate fibers which can be used in this invention.
Figure 3B:
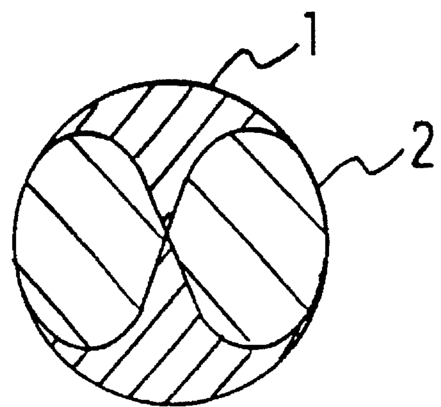
Figure 3C:
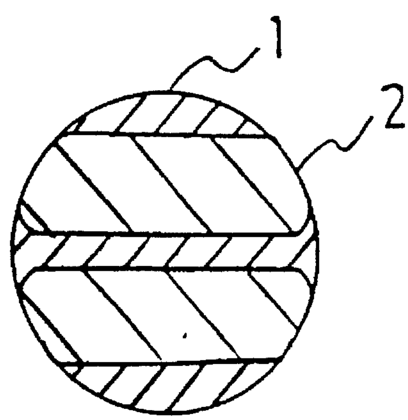
Figure 3D:
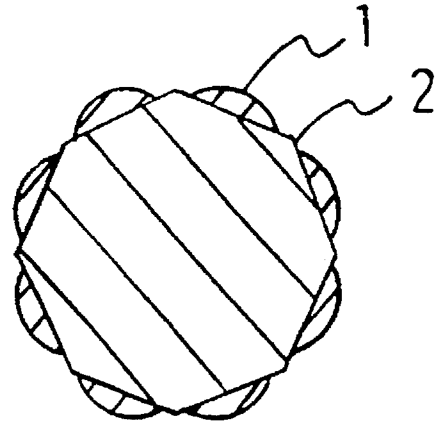
Figure 4A:
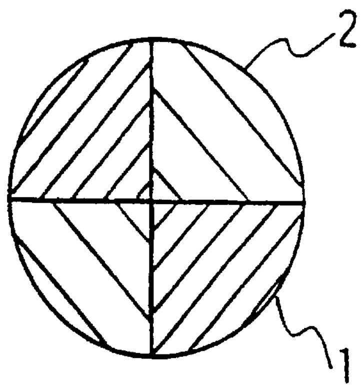
FIG. 4(*a*)–(*f*) show typical sectional forms of the other kinds of conjugate fibers which can be used in the invention.
Figure 4B:
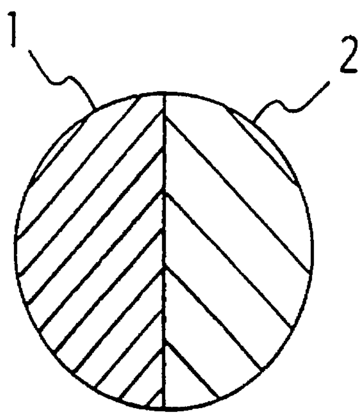
Figure 4C:
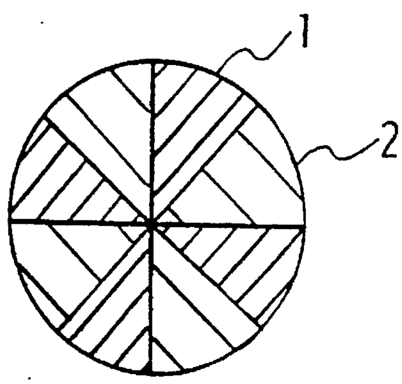
Figure 4D:
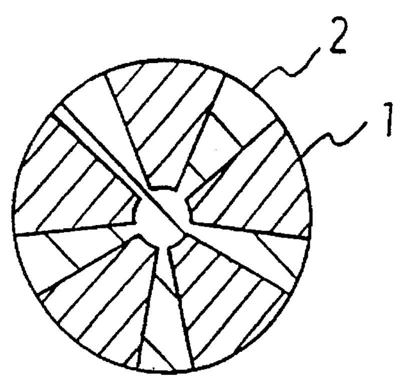
Figure 4E:
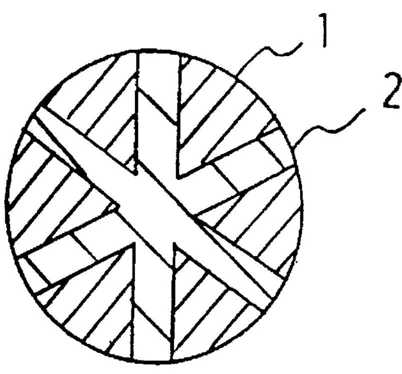
Figure 4F:
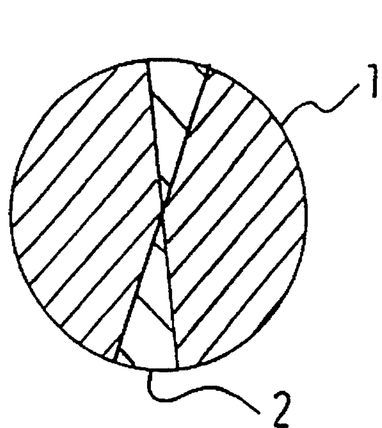

In order to improve the problems above mentioned, the conjugate fiber according to the invention has a specific sectional form such as shown in FIG. 1 to FIG. 4. FIG. 1 shows a sectional view in which the second component is situated in the center in a substantially quadrangular shape. The first component is situated outside of each side of the quadrangle, in a partially circular shape. Thus, as a whole, FIG. 1 has a circular sectional form. FIG. 2 shows a sectional view in which the second component is situated in the center in a four-leaf shape, and the first component is situated outside of the second component. Thus, as a whole, FIG. 2 has a circular sectional form. FIG. 3(*a*) shows a sectional view in which the second component is situated in the center in a four-leaf shape. However, in this case, the second component is not divided into four leaves as in FIG. 2. FIG. 3(*b*) shows a sectional view in which the second component is situated in the center as two-leaf swelling shape. The first component is situated outside of the second component. Thus, as a whole, FIG. 3(*b*) has a circular sectional form. FIG. 3(*c*) shows a sectional view in which the second component is situated in the center in the form of a sandwich. The first component is situated outside of the second component. Thus, as a whole, FIG. 3(*c*) has a circular sectional form. FIG. 3(*d*) shows a sectional view in which the second component is situated in the center in a substantially octagonal shape. The first component is situated outside of each side of the octagon of the second component in a partially circular form. At least one of the first and second components of each form is exposed to the outside of the fiber. FIGS. 4(*a*) to (*f*) show other types of sectional forms which can be used in the invention.

According to the invention, any non-woven fabric sheet can be selected and thermally bonded. For example, a non-woven fabric sheet can be selected from a spun-bond non-woven fabric sheet, a needle punched non-woven fabric sheet, a wet process non-woven fabric sheet, a melt-blow non-woven fabric sheet, etc.

The details of the invention are described with concrete examples. It is not to be construed that these examples are limitating, but that they are merely illustrative of the invention.

EXAMPLE 1

Conjugate fibers consisting of 4 wt % (1.61 mol %) acrylic acid and 96 wt % (98.39 mol %) ethylene having a melting point at 99° C., as a first component, and polypropylene with a MFR (melt flow value) of 30 g/10 min. (at 230° C.), as a second component, was used. The weight ratio of the first component and the second component of the conjugate fiber was 20:80 and the exposure ratio of the first component to the surface of the fiber is 85%. The conjugate fiber consisted of 2d×51 mm having a sectional form as shown in FIG. 1. The fibers obtained were made into webs using a roller card. Then, using a hot air penetration machine at 120° C., the fibers were thermally bonded together and pressed by a pair of calendar rollers heated at 80 ° C. to obtain a non-woven fabric of 65 g/m$^2$ having a thickness of 0.20 mm.

This non-woven fabric sheet was then dipped and held in 10 wt % fuming sulfuric acid heated to 25° C. for 10 minutes. The sheet was then dipped in dilute sulfuric acid and washed with a great quantity of water. After dipping, the sheet was subjected to a neutralization treatment using diluted aqueous ammonia, then sufficiently washed and dried to obtain a non-woven fabric sheet storage battery separator according to the invention. The non-woven fabric sheet had 0.4 m equivalent sulfo groups.

EXAMPLE 2

Conjugate fibers consisting of 2d×51 mm having a sectional form as shown as FIG. 2 were obtained using first and second components as in Example 1. The weight ratio of the first component and the second component of the conjugate fiber was 30:70 and the exposure ratio of the first component to the surface of the fiber was 80%. A web of the blend fibers consisting of 70% by weight of the conjugate fibers, and 30% by weight of regular polypropylene fibers at 1.5d×38 mm, were subjected to thermal treatment and thermal press using a pair of calender rollers as in Example 1. A non-woven fabric sheet was obtained having a weight of 65 g/m$^2$ and a thickness of 0.2 mm.

This non-woven fabric sheet was then contacted and held in 8 vol. % concentrated $SO_3$ gas heated to 60° C. for 30 seconds in gaseous phase, then washed with a great quantity of water. Then, the sheet was subjected to a neutralization treatment using diluted aqueous ammonia, then sufficiently washed and dried to obtain a non-woven fabric sheet storage battery separator according to the invention. The non-woven fabric sheet had 0.2 m equivalent sulfo groups.

EXAMPLE 3

A conjugate fiber of 2d×51 mm and having a sectional as form shown in FIG. 4(*e*) was obtained using resins as in Example 1 and Example 2. A fiber web consisting of 50% by weight of the conjugate fibers, and 50% by weight of regular polypropylene fibers of 1.5d×38 mm, was subjected to thermal pressing using a pair of calender rollers heated to 110° C. A non-woven fabric sheet was obtained having a weight of 65 g/m$^2$ and a thickness of 0.20 mm. Then the non-woven fabric sheet was dipped and held in 97 wt % condensed sulfuric acid at 80° C. for 3 minutes, then dipped in diluted sulfuric acid and washed with a great quantity of water. Then the sheet was subjected to a neutralization treatment with aqueous ammonia, then sufficiently washed and dried to obtain a non-woven fabric sheet storage battery separator according to the invention. The non-woven fabric sheet had 0.1 m equivalent sulfo groups.

Comparative example 1

A sheath-to-core conjugate fiber consisting of 2d×51 mm fibers with a sheath-to-core component ratio of 50:50 was obtained using resins as in Example 1. The sheath component constituted the first component, and the core component constituted the second component. The conjugate fiber was obtained by spinning and drawing. Fusion of some part of the conjugate fiber was confirmed. The card web which was made of the conjugate fiber had an inferior opening property and entanglement of some of the conjugate fibers was found. The fiber web was subjected to thermal treatment, a calendar process and fuming sulfuric acid treatment. The web was washed and sujected to a neutralization treatment and dried to obtain the non-woven fabric sheet of the comparative example.

Comparative example 2

A blend fiber web consisting of 70% by weight of core-sheath type conjugate fibers of 2d×51 mm, having polyethylene for the sheath portion and polypropylene for the core portion, and 30% by weight of regular polypropylene fibers of 1.5d×38 mm were processed by using a hot air penetration machine at 140° C. Then, the sheath component of the sheath-to-core type conjugate fiber was fused to the polyethylene, and the fibers were thermally bonded. The thickness of the conjugate fiber was controlled by passing through a pair of calendar rollers heated to 105° C. A non-woven fabric sheet of 65 g/m$^2$ having a thickness of 0.20 mm was obtained.

Then, the obtained non-woven fabric sheet was subjected to sulfonation in the same way as in Example 2 and then washed with water. Then the sheet was subjected to a neutralization treatment using diluted aqueous ammonia, and sufficiently washed and dried to obtain a non-woven fabric sheet storage battery separator.

Various physical property tests were conducted on the in Examples and storage battery separators obtained the Comparative examples.

Results are shown in Table 1.

TABLE 1

| Test Item | Ex. 1 | Ex. 2 | Ex. 3 | Comparative ex. 1 | Comparative ex. 2 |
|---|---|---|---|---|---|
| Weight(g/m$^2$) | 68 | 68 | 68 | 68 | 65 |
| Thickness (mm) | 0.20 | 0.20 | 0.20 | 0.20 | 0.20 |
| Water content (wt %) | 0.95 | 0.78 | 0.93 | 0.95 | 0.03 |
| Liquid absorption speed (mm) | 80 | 85 | 75 | 81 | 0 |
| Liquid retention percentage (%) | 318 | 328 | 315 | 320 | 145 |
| Alkaline resistance (%) | 0.2 | 0.2 | 0.2 | 0.2 | 0.2 |
| Oxidation resistance (%) | 0.1 | 0.1 | 0.1 | 0.1 | 0.1 |
| Mechanical strength retention percentage (%) after sulfonation | 95 | 98 | 93 | 87 | 99 |
| Separator strength (kg/20 mm) | 9.5 | 7.8 | 7.2 | 6.3 | 8.5 |

The test items in Table 1 are explained as follows:

(1) Water content: After leaving battery separator under conditions of 20° C. and RH of 85% for 24 hours (2) Liquid absorption speed: Level of absorption liquid when one end of a battery separator sample 25 mm in width has been dipped and held in caustic potash solution with a specific gravity of 1.30 for 30 minutes.

(3) Liquid retention percentage: Liquid absorption percentage after a battery separator having been dipped in caustic potash solution with a specific gravity of 1.30 has been suspended for 10 minutes and drained.

(4) Alkali resistance: Weight reduction percentage of battery separator after being dipped and held in caustic potash solution with a specific gravity of 1.30 at 80° C. for 30 days.

(5) Oxidation resistance: Weight reduction percentage of battery separator after being dipped and held in blend solution composed of 250 ml of 5 wt % $KMnO_4$ solution and 50 ml of caustic potash solution with a specific gravity of 1.30 at 50° C. for one hour.

(6) Mechanical strength retention percentage after sulfonation: Tensile strength retention percentage of a battery separator before and after sulfonation.

(7) Separator strength (kg/20 mm); pull strength of a separator having a width of 20 mm after sulfonation.

Figure 5:
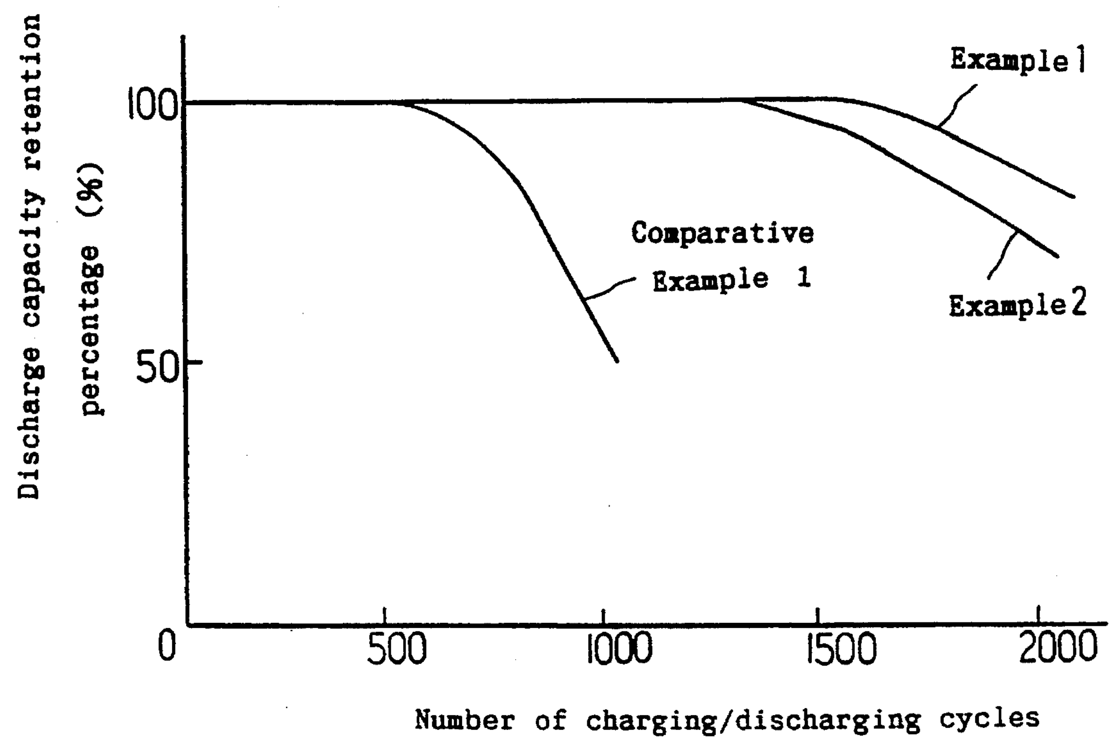
FIG. 5 is a graph representing discharge capacity retention against the number of times of charging and discharging the separators of the Examples.

FIG. 5 shows the results of storage battery performance tests conducted using the non-woven fabric sheet storage battery separators obtained in Examples 1 and 2 and Comparative example 1.

FIG. 5 shows a graph of the discharge capacity retention percentage of Ni-Cd storage batteries having a capacity of 1,200 mA hr. The batteries were repeatedly charged and discharged. Charging was at 20° C. with 400 mA for 4 hours, and discharging was at 1 Ω constant resistance over 2 hours. The ordinate in FIG. 5 represents the discharge capacity retention percentage, and the abscissa represents the number of charging/discharging cycles.

As can be seen from FIG. 5, the batteries using the storage battery separators according to the invention are subject to less discharge capacity reduction after repeated charging and discharging and are durable in that they can withstand long use owing to their excellent affinity to electrolyte. However, the storage battery using the battery separator of Comparative example 1 is subject to discharge capacity reduction by about 1000 times of repeated charging and discharging, which was caused by strength reduction by sulfonation.

In additon according to the result of surface infrared spectrometry of the battery separator, which was obtained in Example 1, Example 2 and Comparative example 1, measured by the ATR method with an angle of incidence of 45°. Using an infrared spectrophotometer (FTIR-8100 by Shimazu Seisakusho), the peak of absorption of the sulfo group was confirmed at 1200 cm$^{-1}$. However, in Comparative example 2, the absorbtion of the sulfo group was not confirmed. As can be seen from the result above mentioned, the storage battery separator according to the invention exhibits excellent affinity to electrolyte without the aid of any surface active agent and has satisfactory liquid absorption and retention properties.

Further, the battery separator according to the invention is also durable with respect to alkali resistance and oxidation resistance, and further it is subject to less mechanical strength reduction after sulfonation. Thus, the separator can sufficiently withstand the repeated charging and discharging over a long period when it is assembled in a storage battery.

According to the explanation of the invention, the conjugate fibers is easily formed in card machine web forming and the fiber thermally bonds excellently to a polyolefin based fiber to form a non-woven fabric sheet. The alkaline storage battery separator according to the invention has an excellent hydrophilic property and maintains an excellent affinity to electrolyte for a long period and has satisfactory liquid absorption and retention properties, since the conjugate fiber according to the invention can have sulfo groups easily introduced. Further, the battery separator according to the invention is also durable with respect to alkali resistance and oxidation resistance, and the life of a storage battery can be prolonged remarkably. In addition, since the battery separator according to the invention is soft to form a non-woven fabric sheet, it is good workability of the assembly storage battery operation.

Further, this invention has various kinds of effects such as providing a stable and economical non-woven fabric separator having an excellent hydrophilic property and excellent strength by using the conjugate fiber having the specific sectional form.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

What is claimed is:

1. A method of manufacturing an alkaline storage battery separator comprising:

(A) forming a fiber web of conjugate fibers of a thermally bonding type and a polyolefin based fiber, said conjugate fibers comprising a first component having an ethylene based random copolymer of 0.5 to 25% by weight of acrylic acid and/or maleic acid, 0 to 24.5 % by weight of an acrylic acid ester and 99.5 to 75% by weight of ethylene, said copolymer having a melting point $Tm_1$° C., 70° C.<$Tm_1$<130° C., and a second component of a polyolefin based resin having a melting point $Tm_2$° C. of $Tm_1$+20° C.<$Tm_2$<250° C., and at least one of said first and second components has a sectional form divided into more than two parts with each component having at least one exposed surface and said first and second components have a weight ratio of 10:90 to 90:10 and an exposure ratio of 95:5 to 50:50;

(B) forming a non-woven fabric sheet by passing said fiber web through thermal press rollers to form a non-woven fabric sheet by melting said first component; and (C) introducing sulfonic acid groups into tertiary carbon atom locations on the ethylene based random copolymer by contacting the non-woven fabric sheet with a sulfuric acid solution or a $SO_3$ gas.

2. The method of manufacturing an alkaline storage battery separator according to claim 1, wherein said second component has a sectional form of a substantially rose curve or substantially octagonal shape.

3. The method of manufacturing an alkaline storage battery separator according to claim 1, wherein said sulfonic acid groups are introduced by contacting the non-woven fabric sheet with $SO_3$ gas.

4. The method of manufacturing an alkaline storage battery separator according to claim 1, wherein said non-woven fabric sheet comprises a mixture of 30% or more by weight of conjugate fibers and 70% or less by weight of polyolefin fibers.

* * * * *